E. M. HEYLMAN.
ENGINE GANG PLOW.
APPLICATION FILED SEPT. 15, 1916.
1,262,948.
Patented Apr. 16, 1918.
2 SHEETS—SHEET 1.
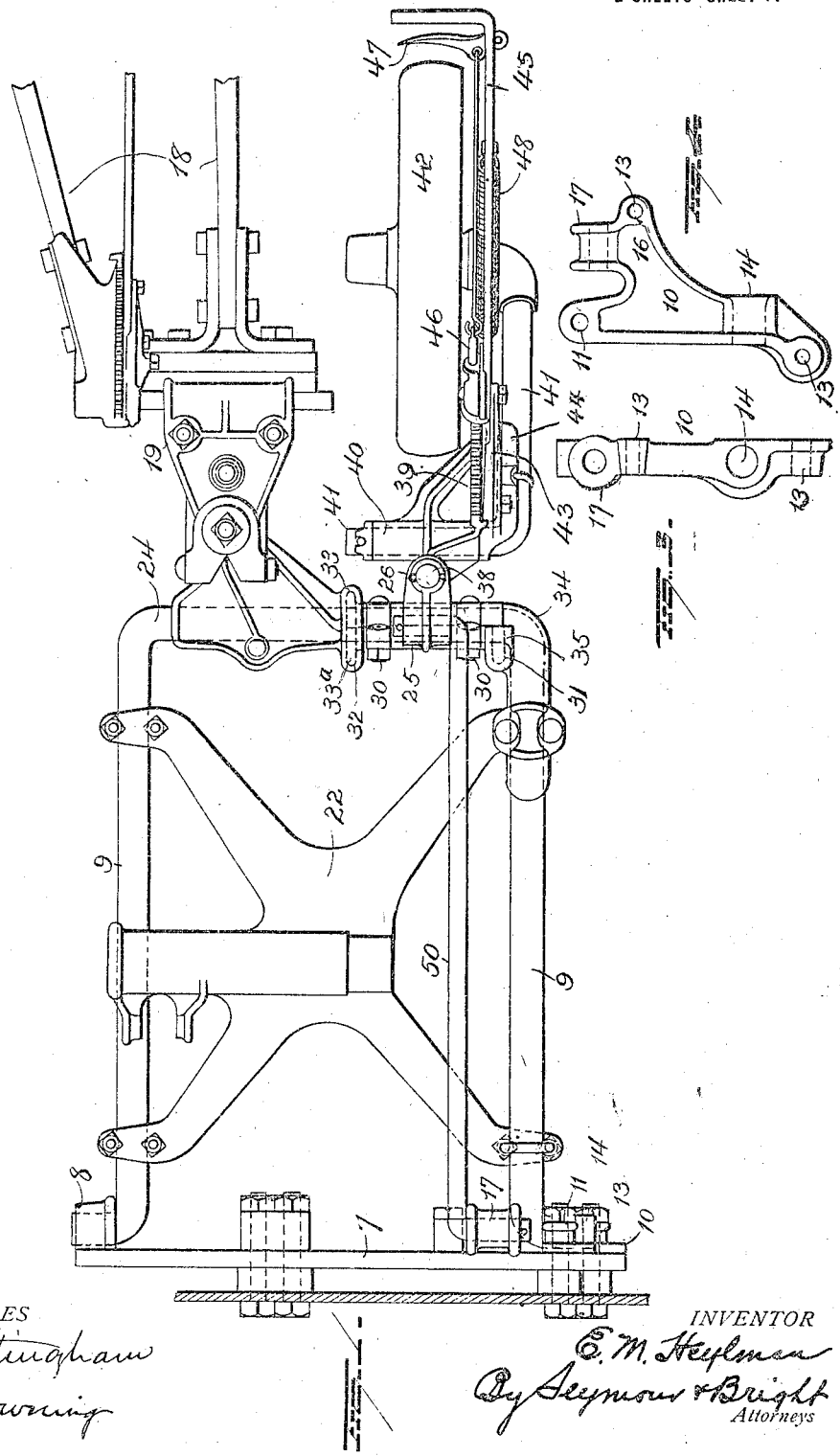
WITNESSES
E. I. Nottingham
G. F. Downing
INVENTOR
E. M. Heylman
By Seymour & Bright
Attorneys

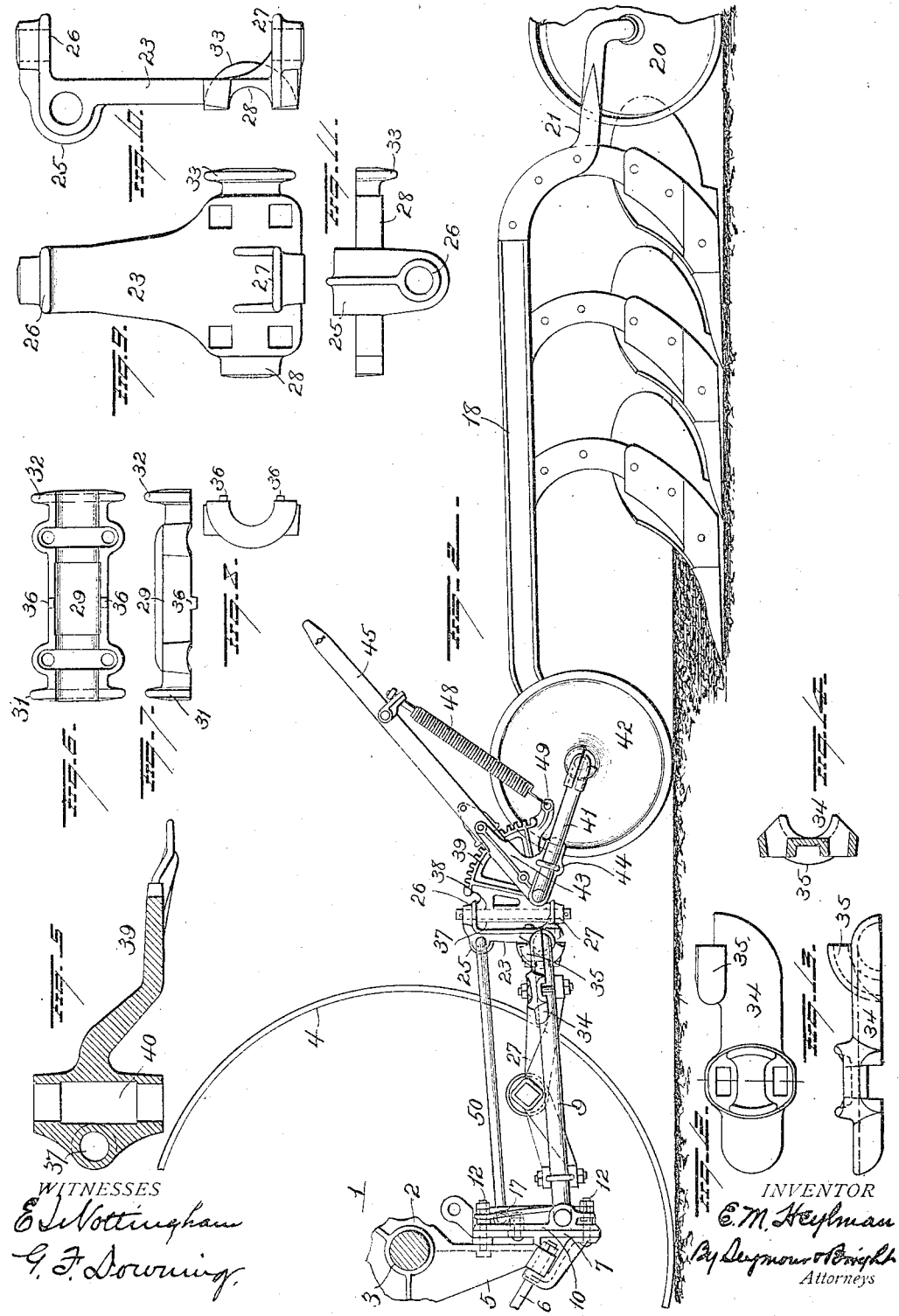

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

ENGINE GANG-PLOW.

1,262,948.   Specification of Letters Patent.   Patented Apr. 16, 1918.

Application filed September 15, 1916. Serial No. 120,368.

*To all whom it may concern:*

Be it known that I, EDWARD M. HEYLMAN, a citizen of the United States, and a resident of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to that type known in the art as "engine gang plows," such as employ a draft device comprising a bail connecting the plows with the tractor as illustrated in application for patent filed by me on the 7th day of July 1916 and designated by Serial No. 108,023.

One object of my present invention is to provide simple and efficient means for regulating the depth of plowing when passing over uneven places in the field.

A further object is to provide means in an engine gang plow employing a bail draft device, which will operate automatically, to insure uniform depth of plowing regardless of the unevenness of the ground.

A further object is to obviate the necessity for continual manipulation of adjusting devices when the plow is passing over uneven ground, and to insure the automatic rise and fall of the rear end of the draft bail to which the plows are connected, in conformity to the unevenness of the ground and thus cause the soil engaging members to maintain uniform depth of plowing.

A further object is to provide a gage wheel structure having a pivotal connection with the rear end of a pivoted draft bail, and in which the axle of said gage wheel shall be caused always to be maintained in a vertical position at whatever adjustment for depth of plowing said gage wheel may be set, and to so mount said vertical axle that it may freely turn and permit the gage wheel to properly trail when it is necessary to turn the plow when the soil-engaging members are in the ground.

A further object is to provide a gage wheel structure having the characteristics above outlined, with manually operable means for adjusting the draft bail and thus raising or lowering the plow gang to adjust the same for depth of plowing.

With these and other objects in view, the invention consists in certain novel features of construction and combinations of parts as hereinafter set forth and pointed out in the claims.

In the accompanying drawings; Figure 1 is a plan view of a portion of an engine gang plow structure, illustrating an embodiment of my invention; Fig. 2 is a side elevation; and Figs. 3 to 14 are views illustrating details of construction.

1 represents a portion of a tractor comprising, as part of the structure, a bearing bracket 2 for the accommodation of the rear axle 3 secured in the hubs of wheels 4,—motion being imparted to said axle or to the wheels in any suitable manner. The bracket 2 is made with a depending portion 5 adapted at its lower end for the attachment of a stay rod 6.

A plate 7 is secured to the depending portion of the bearing bracket and is provided at one end with a bearing 8 to receive one of the journals of a bail or draft device 9. Near the other end of the plate 7, a bracket 10 is located and secured in place by means of bolts 12 passing through holes indicated at 11, 13, 13,—Fig. 4. The lower portion of the bracket 10 is formed with a bearing 14 in which the journal at the rear end of the other bail member is mounted. Thus it is apparent that the draft bail is pivotally connected with the tractor.

The bracket 10 is also made near its upper portion with an upwardly projecting arm 16 formed with a hollow boss 17, for a purpose hereinafter explained.

As disclosed in my said application, a plow gang 18 is pivotally connected, through the medium of coupling devices 19, with the rear cross bar of the bail 9 and at the rear end of the plow gang, a wheel 20 may be located and mounted on a suitable bracket 21 secured to the rearmost beam of the plow gang,—said wheel constituting a rear support and a rolling fulcrum for the plow gang.

The draft bail will preferably be strengthened by means of cross braces 22.

An upright bracket 23 is pivotally mounted on the rear cross bar 24 of the draft bail and provided at its upper end with a perforated boss 25 and at its upper and lower ends with rearwardly projecting perforated arms 26—27. The lower portion of the bracket 23 is formed with an elongated concave portion 28 of a bearing sleeve to receive the cross bar of the draft bail,—the other portion of said bearing sleeve being formed by a cap 29 and said sleeve portions 28 and 29 are secured together by means of bolts 30,—thus effecting the pivotal connection of the bracket with the draft bail, as above mentioned. The sleeve portion 29 is provided at its respective ends with flanges 31 and 32, and the sleeve portion 28 is provided at one end with a flange 33 alining with the flange 32, the two flanges 32—33 forming an annular flange to be engaged by a lip or flange 33ª on the coupling devices which connect the plow gang with the draft bail. A cap 34 is rigidly secured to the draft bail by means of bolts and is curved at one end to conform to the bend of the bail between the cross bar and one of the side members thereof. At its rear end, the cap is formed with a curved lip 35 to receive the flange 31 at one end of the sleeve member 29. Movement of the sleeve members relatively to each other may be prevented by pins 36 on one entering sockets in the other. From the construction above described, it will be seen that while the bracket 23 is pivotally connected to the cross bar of the bail, it will be prevented from movement longitudinally of said cross bar.

A vertical sleeve 37 is disposed between the arms 26—27 of the bracket 23 and is pivotally connected with said arms by means of a pivot pin 38. The sleeve 37 may be formed integral with and at or near one end of a toothed segment 39, and at or near the juncture of the lower end of the latter with the sleeve 37 a horizontal sleeve 40 is located. The sleeves 37 and 40 and the segment 39 thus form a bracket having swivel connection with the rear end of the draft bail. The horizontal sleeve 40 constitutes a bearing for the rear horizontal member of a U-shaped axle 41 and the rear horizontal member of this axle is suitably mounted in the hub of a gage wheel 42.

A lever 43 is mounted on the upper horizontal member of the axle and provided with an arm 44 rigidly secured to the diagonal body portion of said axle. A hand lever 45 is secured to and constitutes an extension of the lever 43. A suitable detent 46 to engage the toothed segment 39 and a manually operable finger lever 47 is provided on the lever for withdrawing the detent from the segment.

A balancing spring 48 is connected at one end to an arm 49 projecting from the rear end of the segment and the other end of this spring is adjustably connected with the hand lever 45, as clearly shown in Fig. 2.

A connecting rod 50 is pivotally connected at its forward end to the boss 17 of bracket 10 and at its rear end, said rod is pivotally connected with the boss 25 at the upper end of the bracket 23. By this means, the bracket 23 and hence the pivot sleeve 37 will always be maintained vertically disposed to permit the gage wheel to swivel and properly trail regardless the vertical adjustment of the gage wheel relatively to the bail and the plow gang.

From the construction and arrangement of parts above described, it is apparent that the plow gang may be readily adjusted for depth of plowing, by manipulating the lever 45, and that during the normal operation of the plow, the running of the gage wheel over the ground will operate automatically to raise and lower the bail and the forward end of the plow gang in conformity to the contour of the ground,—thus insuring uniform depth of plowing regardless of the unevenness of the ground.

My improvements avoid the necessity of providing normally rigid supporting means for the draft bail, or flexibly supporting the rear end of the bail from the tractor or a part to which the bail is pivoted. The gage wheel is located in close proximity to the forward end of the plow gang and the vertical movements of the latter in passing over uneven ground will not be so affected by the up-and-down movements of the tractor as to cause irregular plowing, as might occur, on account of the considerable distance of the tractor in advance of the forward end of the plow gang, were the gage wheel at the rear end of the bail not provided.

Various slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

1. The combination with a tractor, a pivoted draft device, and a plow pivotally connected with said draft device, of a gage wheel, an axle for said gage wheel, said axle provided with a part having a horizontal pivotal connection and also a swivel connection with the rear portion of the draft device, and manually operable means for adjusting said gage wheel vertically and retaining it at any desired vertical adjustment.

2. The combination with a tractor, a draft device pivoted thereto and a gang of plows pivotally connected with the rear end of said draft device, of a gage wheel, and an axle for said gage wheel, said axle provided with a part having horizontal pivotal connection with the rear end of the draft device, whereby the draft device will be caused to rise and fall in accordance with the unevenness of the ground and all of the plows of the gang will be caused to run at uniform depths.

3. The combination with a tractor, a bail pivoted thereto, and a plow pivotally connected with the rear cross bar of said bail, of a gage wheel, an axle for said gage wheel, said axle having a part having a horizontal pivotal connection with the rear cross bar of the bail, and means for adjusting the gage wheel to adjust the rear end of the bail and the plow to regulate the depth of plowing of the latter.

4. The combination with a tractor, a draft device pivotally connected therewith, and a plow pivotally connected with the rear end of the draft device, of a bracket pivotally connected with the rear end of the draft device, a gage wheel, an axle for the gage wheel pivotally mounted in said bracket, and means carried by the bracket and connected with said axle for adjusting the gage wheel.

5. The combination with a tractor, a draft device pivoted thereto, and a plow pivotally connected with the rear end of said draft device, of a bracket having a vertical pivotal connection with the rear end of the draft device, a gage wheel, and an axle for the gage wheel having a horizontal pivotal connection with the swiveled bracket.

6. The combination with a tractor, a draft device pivoted thereto, and a plow pivotally connected with the rear end of the draft device, of a vertically disposed bracket pivotally connected with the rear end of the draft device, a bracket swiveled to said vertically disposed bracket and adapted to swing laterally, a gage wheel, an axle for the gage wheel having a horizontal portion pivotally mounted in the swiveled bracket, and means for adjusting the gage wheel to regulate the depth of plowing.

7. The combination with a tractor, a draft device pivotally connected therewith, and a plow pivotally connected with the rear end of the draft device, of a vertically disposed bracket pivotally mounted at its lower end on the rear end of the draft device, a rod pivotally connected at its rear end with the upper portion of said pivoted bracket and pivotally connected at its forward end with the tractor, a bracket swiveled to said pivoted bracket, a gage wheel, an axle for the gage wheel having a horizontal portion pivotally mounted in said swiveled bracket, and means for adjusting the gage wheel to regulate the depth of plowing.

8. The combination with a tractor, a draft device pivoted thereto, and a plow pivotally connected with the rear end of the draft device, of a bracket pivoted to the rear end of the draft device, a swiveling bracket comprising a vertical member having a vertical swivel connection with the pivoted bracket, a toothed segment, and a horizontal sleeve adjacent to the juncture of the lower end of said vertical member with the lower portion of the segment, a gage wheel, an axle for the gage wheel having a part mounted loosely in said horizontal sleeve, a lever secured to said axle, and manually operable locking means carried by said lever and coöperating with the toothed segment.

9. The combination with a tractor, a draft device pivoted thereto, and a plow pivotally connected with the rear end of the draft device, of a bracket having swivel connection with the rear end of the draft device to swing laterally, said bracket comprising a toothed segment and a horizontal sleeve, a gage wheel, an axle for the gage wheel having a part loosely mounted in said horizontal sleeve, a lever secured to said axle, manually controlled locking means carried by the lever and coöperating with the toothed segment, and a balancing spring connected at one end with the lever and at the other end with said segment.

10. The combination with a tractor, a draft bail pivotally connected therewith, and a plow pivotally connected with the rear cross bar of said bail, of a vertical bracket, separable coupling means pivotally connecting the lower end of said bracket with the rear cross bar of the bail, means preventing displacement of the bracket, a rod connecting the upper end of said bracket with the tractor, a swiveling bracket connected with said first-mentioned bracket, a gage wheel, a U-shaped axle for said gage wheel having its upper member mounted loosely in said swiveling bracket, and manually operable means connected with said axle to adjust the gage wheel.

In testimony whereof, I have signed this specification in the presence of two subscribing witnesses.

EDWARD M. HEYLMAN.

Witnesses:
EDWIN NICAR,
KATE E. BUCKLEY.